3,424,839
TETRACYCLINE AND ENTERIC-COATED CHYMOTRYPSIN ORAL TABLETS AND THERAPY
Jean Montandraud, Casablanca, Morocco, assignor, by mesne assignments, to Societe Generale de Recherches et d'Applications Scientifiques Sogeras, Paris, France
No Drawing. Filed Feb. 27, 1964, Ser. No. 347,711
Claims priority, application Great Britain, July 2, 1963, 26,237/63
U.S. Cl. 424—26    3 Claims
Int. Cl. A61k *9/00, 21/00*

ABSTRACT OF THE DISCLOSURE

A chymotrypsin and tetracycline oral tablet prepared by pressing 50,000 Armour units of chymotrypsin admixed with suitable dry granulation excipients into a central core tablet form, after which the core is enteric-coated and covered all around with 250 mg. of tetracycline admixed with suitable granulation excipients. The tablet is effective for obtaining increased chymotrypsin-tetracycline anti-inflammatory and anti-infection efficacy in pre- and/or postoperative surgical patients.

---

Compositions in which enzymes and antibiotics are associated have already been described in literature. For instance, Australian Patent No. 231,938 by the National Drug Company describes associations of trypsin with penicillin G, with streptomycin and with procaine penicillinate. However, the description of these associations is only a recitation of their constituents and gives no details regarding their method of administration.

In the case of some antibiotics, and in particular of tetracycline and its derivatives, it has been shown (Pindell et col., J. Pharm. Exp. Ther., April 1959, pp. 287/294) that the amount of tetracycline in the blood is greater and more lasting where the antibiotic is liberated in the hydrochloric stomachic medium than where it is liberated in the intestinal medium, where it is destroyed by hydrolysis by the action of the intestinal enzymes.

Conversely it is desirable to liberate anti-inflammatory proteolytic enzymes of the trypsin or chymotrypsin type only in the intestinal medium, where they then develop their optimum activity.

Hence it is evident that in the case of an association of these two types of constituents, of tetracycline and of trypsin, for instance if the two constituents are administered in the form of an enteric pill, as described in the aforementioned Australian patent, then, whereas the enzyme would indeed enjoy optimum conditions for action, the tetracycline, however, would be administered under unfavorable conditions.

The object of the present invention is to remedy this disadvantage and it relates to a new and particular association of the aforementioned type and to a Galenic form of this association adapted to the most favorable conditions for the action of the constituents of the said association.

The association according to the invention is an association of at least one derivative of the tetracycline type, such as tetracycline itself, oxytetracycline, chlorotetracycline or the like, with at least one enzyme having a hydrolyzing and/or depolymerizing action, such as trypsin, chymotrypsin, the pancreatic enzymes, cultured fungic enzymes, such as those extracted from *Aspergillus orizae*, for instance, bacterial enzymes extracted from cultures of bacteria, papain, bromelaine, ficine, the fungic amylases or malt extracts, and also other enzymes, of animal or vegetable origin, having a proteolytic, esterasic, fibrinolytic and/or depolymerizing activity.

For the saks of convenience in the remainder of the present description, reference will chiefly be made to the association of tetracycline with chymotrypsin, the advantages of which have been clinically observed. It seems that these advantages can be attributed partially to a better penetration of the antibiotic, resulting from a permeabilization of the tissues and from a fluidification of the secretions, both due to the enzyme, and providing increased anti-inflammatory and anti-infectious efficacity by reason of the rise of the level of the anti-bacterial agent in the blood.

Moreover it has been described (J. Pharm. Exp. Ther., April 1959, pp. 287 and sq.) that the serum level of tetracycline is higher and more durable when tetracycline is administered in the stomach instead of the intestine. The conjunction of these phenomena can be tentatively taken as an explanation of the surprising and unexpected results obtained through the use of the new association of the invention.

In view of the foregoing remarks regarding the optimum intervention zone of each of these constituents, the invention also relates to the said association of a derivative of the tetracycline type with a hydrolyzing enzyme as defined above, administered in the form of a pill having a double nucleus, the enzyme constituting the central nucleus of the said pill being coated with an enteric coating, such as gluten or a resin or a natural or artificial lacquer, for instance, this coating being insensitive to the gastric medium and in particular to pepsin, and the derivative of tetracycline constituting the outer zone of the said pill so that it manifests an instantaneous stomachic action.

As coating materials can be cited gluten, acetophthalic resins, and cationic acrylic polymerizates such as "Eudragit."

Pills of this kind may be charged with 2,000–100,000 Armour units of enzymes, e.g. chymotrypsin, with 50–500 mg. of antibiotics, e.g. tetracycline, the preferred ratio being 50,000 Armour units of chymotrypsin for 250 mg. of tetracycline, the dose of such pills being of the order of 4 to 8 daily.

By way of example, there will next be described a procedure for the preparation of a product according to the invention:

EXAMPLE

Central core: 50,000 Armour units of chymotrypsin are thoroughly mixed with 20 mg. mannitol, 1 mg. magnesium stearate and about 80 mg. talc. The mixture is dry-granulated and pressed into tablets.

Coating: In a turbine apparatus there is applied to said tablets firstly a coating of gum arabic (from an alcoholic solution), then 19 layers of cellulose acetophthalate (from an acetonic solution).

Outer layer: 250 mg. of tetracycline hydrochloride, 35 mg. mannitol, 20 mg. sorbitol, 3 mg. carboxymethylcellulose, 7 mg. magnesium stearate and 35 mg. talc are thoroughly mixed, granulated and pressed all around the coated core, until tablets or pills weighing 450 mg. are obtained. Such tablets can be used as such or after sugar coating.

According to the invention, the administration of these associations in the form of these double nucleus pills ensures a more effective and lasting action of the antibiotic than that observed where the same doses of the same antibiotic are administered by the usual methods.

This action has been observed upon a very high number of clinical tests, 57 of the more important are reported hereunder.

The therapeutic action of the product has been studied on 57 patients recruited either from my practice or from among the patients in my charge at the Saint-Louis Hospital, Paris, France, or from among private patients.

Four main types of operation seem to me to warrant consideration.

(1) Acts of minor stomatological surgery:

removal of cysts, apical resection,
extraction of impacted wisdom teeth or canines,
multiple extractions,
adamantinome curetting of negligible importance.

The treatment is usually ambulatory, and it is particularly interesting to obtain the almost complete disappearance of post-operatory incidents cited above.

This relates particularly to pains due to subsequent infections.

(2) External surgical operations of negligible importance arising almost solely from plastic surgery and only accompanied by limited impairment to health:

plastic surgery of the lip,
extra-capsulary sub-maxillectomies,
removal of cysts of the thyroglossal tract,
removal of fistulized adenopathies, which are almost always from former tuberculosis.

These limited interventions have usually a simple consequence but a persistent oedema or a secondary infection are always to be feared and avoided.

(3) The third group comprises major surgical operations for example:

sub-maxillary or jugulo-carotidian cleaning,
bilateral mandibular resection, for prognathiam,
parotidectomy with facial preservation,
cutaneous fat grafts,
hemi-maxillary resection.

Here we are concerned with the importance of oedemas which cause post-operative discomfort. Oedema similarly disturbs the perfect adhesion of flaps of tissue and spoils sutures.

(4) Finally the last group comprises more or less individual operations in the service of the Saint-Louis Hospital:

electro-coagulations of malignant tumors,
epithelioma of the tongue or of the buccal floor,
sarcoma of the jaw,
epithelioma of the lips,
epithelioma of the upper jaw bone.

Since electro-coagulation, besides producing local destruction, also produces extensive burning, it is always the cause of considerable oedema which brings about a mechanical discomfort hindering swallowing, and in the case of electrocoagulations of the buccal floor and of the tongue, hindering speech.

Depending on the patients and on the modification to the lymphatic system caused by the burn, this oedema is more or less intensive.

MEANS OF USING THE PRODUCT

I have used the following dosage:

4 sugar-coated pills as described in the example above, on the eve of the operation,
6 sugar-coated pills on the eve of the operation and on the following day,
4 sugar-coated pills per day for two to four days according to the importance of the operation and the condition of the patient.

In the majority of my observations the composition according to the invention was the only medication used.

In certain cases local conditions and the area, obliged me to use an associated treatment:

in 3 cases the use of a supplementary antibiotic treatment in the form of intramuscular penicillin, in 11 cases a sedative treatment: "Equanil," "Immenoctal," "Nealgyl."

SUPERVISION OF THE PATIENT

The majority of observations relate to patients in the hospital whom it is easy to supervise.

Out-patients were examined after an average period of 3 to 8 days. I noted, from questioning and clinical examination, the duration and intensity of pains, the degree of oedema, the amount of bleeding, the appearance of the wound.

OBSERVATIONS

I shall give hereinafter the summary of 57 clinical observations constituting the subject of our experiment.

| Obs. | Oedema | Pain | Haemorrhage | Infection | Intolerance | Classification |
|---|---|---|---|---|---|---|
| 1 | ++ | 0 | 0 | 0 | 0 | G |
| 2 | + | ± | (¹) | 0 | 0 | A |
| 3 | 0 | ± | 0 | 0 | 0 | G |
| 4 | 0 | 0 | 0 | (²) | 0 | G |
| 5 | ± | 0 | 0 | 0 | 0 | E |
| 6 | ± | 0 | 0 | 0 | 0 | E |
| 7 | 0 | 0 | 0 | 0 | 0 | E |
| 8 | 0 | 0 | 0 | 0 | 0 | E |
| 9 | ± | 0 | 0 | 0 | 0 | E |
| 10 | 0 | 0 | 0 | 0 | 0 | E |
| 11 | ± | 0 | 0 | 0 | 0 | E |
| 12 | + | + | 0 | (³) | 0 | G |
| 13 | + | + | ± | (⁴) | + | G |
| 14 | ± | 0 | 0 | 0 | 0 | G |
| 15 | ± | 0 | 0 | 0 | 0 | E |
| 16 | ± | 0 | 0 | 0 | 0 | E |
| 17 | ± | 0 | 0 | 0 | 0 | E |
| 18 | + | ± | 0 | 0 | 0 | G |
| 19 | 0 | 0 | 0 | 0 | 0 | E |
| 20 | ± | ± | 0 | 0 | 0 | E |
| 21 | + | ± | 0 | 0 | 0 | G |
| 22 | ± | 0 | 0 | 0 | 0 | E |
| 23 | ++ | ± | 0 | 0 | 0 | G |
| 24 | ± | 0 | 0 | 0 | 0 | E |
| 25 | ± | 0 | 0 | 0 | 0 | E |
| 26 | ± | + | 0 | 0 | 0 | G |
| 27 | ± | 0 | 0 | 0 | 0 | G |
| 28 | ± | 0 | 0 | 0 | 0 | E |
| 29 | + | ± | 0 | 0 | 0 | G |
| 30 | + | + | 0 | | | ++ | A |
| 31 | + | + | 0 | 0 | 0 | G |
| 32 | ± | ± | 0 | 0 | 0 | E |
| 33 | + | ± | 0 | 0 | 0 | G |
| 34 | + | 0 | 0 | 0 | 0 | G |
| 35 | ++ | ± | 0 | 0 | 0 | A |
| 36 | ++ | ± | 0 | 0 | 0 | A |
| 37 | ++ | ± | 0 | 0 | 0 | G |
| 38 | ++ | + | 0 | (⁵) | 0 | A |
| 39 | ++ | + | 0 | | | 0 | A |
| 40 | ++ | 0 | 0 | 0 | 0 | A |
| 41 | + | + | 0 | 0 | 0 | G |
| 42 | + | ± | 0 | 0 | 0 | G |
| 43 | + | 0 | 0 | 0 | 0 | G |
| 44 | ++ | ± | 0 | 0 | 0 | G |
| 45 | + | ± | 0 | 0 | 0 | G |
| 46 | + | + | 0 | 0 | 0 | E |
| 47 | ++ | + | 0 | 0 | + | A |
| 48 | ++ | + | 0 | 0 | 0 | A |
| 49 | + | ± | 0 | 0 | 0 | G |
| 50 | ++ | + | 0 | 0 | 0 | A |
| 51 | ± | ± | 0 | 0 | 0 | E |
| 52 | ++ | ± | 0 | 0 | 0 | A |
| 53 | ++ | ± | 0 | (⁶) | 0 | A |
| 54 | + | ± | 0 | 0 | 0 | G |
| 55 | ± | 0 | 0 | 0 | 0 | E |
| 56 | ± | 0 | 0 | 0 | 0 | G |
| 57 | ± | + | 0 | 0 | 0 | E |

¹ Ecchymosis.
² Alveolite after cessation of treatment.
³ Alveolite on 4th day.
⁴ 38.3° on the 2nd day.
⁵ Sub-mucous fistula.
⁶ 39° on the 4th day.

EXPLANATION OF SYMBOLS

I have classified by means of crosses oedema: 0, no odema; ± or +, minimum oedema; ++, average oedema; +++, important oedema; ++++, serious oedema.

This is obviously only a relative classification as a function of the importance of the operation and of what is usually found.

Pain: 0, absence of pain; +, brief post-operative pain; ++, pain for several hours per day, slow to disappear; +++, considerable pain; irradiating, hindering sleep; ++++, violent pain.

Haemorrhage: in the more particular case of dental extraction: 0, absence of bleeding; +, minimum bleeding, soon ceasing; ++, uncomfortable bleeding; +++, considerable bleeding necessitating hemostasis.

Temperature: 0, normal temperature with highest temperature at 38°, 38.5° customary on the second day, then return to normal. If not, details.

Intolerance: 0, no disturbance; +, slight passing disturbances; ++, more important disturbances necessitating cessation of treatment.

It should be stressed that these classifications are affected to a large extent by the appreciation of the development of each particular case in relation to what was usually observed in patients operated upon in the hospital.

I have classified the results more analytically as "excellent," "good," "average," "nil."

In Group I or II of minor operations:

Excellent: no pain, no oedema, no alveolite or perfect cicatrization.

Good: slight oedema or pain, diminished in relation to the normal.

Average: oedema and pain to an extent frequently found.

Nil: serious incidents.

In Group III relating to major operations:

Excellent: slight oedema disappearing on the second day, minor pain similarly disappearing in about 48 hours, perfect cicatrization.

Good: more oedema and pain, but in spite of this, in our judgment, improvement in relation to normal recovery.

Average: deforming oedema, considerable pain for 24 hours to 48 hours, sometimes running of wound, corresponds to usual average.

Nil: serious complications.

Finally in Group IV which is so specialized, relating to electro-coagulations, the classification is more or less parallel but with a little more latitude since post-operative reactions are usually very strong and considerably disturb the patient.

We noted:

Excellent: cases where clinical manifestations were exceptionally at a minimum, relating to the apparent oedema of functional disturbance, after electro-coagulation of the tongue for example.

Good: improvement.

Average: usual development.

Nil: Considerable disturbance.

ANALYSIS OF RESULTS

Thus from a total of 57 observations was obtained:

21 excellent results i.e. 36.8
24 good results i.e. 42.2%
12 average results i.e. 21%
0 nil result i.e. 0%

The results are however very variable if the four observation groups are considered singly:

| Results | Group I | Group II | Group III | Group IV | Percent |
|---|---|---|---|---|---|
| Excellent | 7 | 8 | 2 | 4 | 36.8 |
| Good | 6 | 5 | 4 | 9 | 42.2 |
| Average | 1 | 0 | 3 | 8 | 21 |
| Nil | 0 | 0 | 0 | 0 | 0 |

What I claim is:

1. A chymotrypsin and tetracycline oral tablet dosage form prepared by pressing 50,000 Armour units of chymotrypsin admixed with suitable dry granulation excipients into a central core tablet form, enteric-coating said chymotrypsin central core, and thereafter pressing all around the enteric-coated chymotrypsin core 250 mg. tetracycline admixed with suitable granulation excipients.

2. A chymotrypsin and tetracycline oral tablet dosage form prepared by pressing into a central core tablet form a dry-granulated mixture of about 50,000 Armour units of chymotrypsin thoroughly mixed with about 20 mg. mannitol, about 1 mg. magnesium stearate, and about 80 mg. talc, applying to said central core tablets a coating of gum arabic from an alcoholic solution, thereafter applying layers of cellulose acetophthalate from an acetonic solution, and pressing all around the coated core a thoroughly admixed granulation comprising about 250 mg. of tetracycline hydrochloride, about 35 mg. mannitol, about 20 mg. sorbitol, about 3 mg. carboxymethylcellulose, about 7 mg. magnesium stearate, and about 35 mg. talc.

3. A method for obtaining increased chymotrypsin-tetracycline anti-inflammatory and anti-infectious efficacy in pre- and/or post-operative surgical patients which comprises administering to said patients a chymotrypsin and tetracycline oral tablet dosage form prepared by pressing 50,000 Armour units of chymotrypsin admixed with suitable dry granulation excipients into a central core tablet form, enteric-coating said chymotrypsin central core, and thereafter pressing all around the enteric-coated chymotrypsin core 250 mg. tetracycline, admixed with suitable granulation excipients in an effective dosage level of 4–6 tablets on the eve of the operation and thereafter 4 pills per day for 2–4 days according to the importance of the operation and the condition of the patient.

References Cited

UNITED STATES PATENTS

| | | | |
|---|---|---|---|
| 2,834,710 | 5/1958 | Baumgarten et al. | 167—73 XR |
| 2,878,123 | 3/1959 | Beuk et al. | 167—73 XR |
| 2,906,621 | 9/1959 | Catron | 167—73 XR |
| 2,924,521 | 2/1960 | Hewitt et al. | 167—73 XR |
| 2,973,300 | 2/1961 | Farrar et al. | 167—73 XR |
| 3,004,893 | 10/1961 | Martin | 167—73 |
| 3,023,143 | 2/1962 | Ablondi et al. | 167—73 XR |
| 3,181,998 | 5/1965 | Kanig | 167—73 XR |
| 3,208,908 | 9/1965 | Maxwell et al. | 167—73 |
| 3,224,942 | 12/1965 | Martin | 167—73 |

LEWIS GOTTS, *Primary Examiner.*

SHEP K. ROSE, *Assistant Examiner.*